United States Patent Office 2,787,701
Patented Apr. 2, 1957

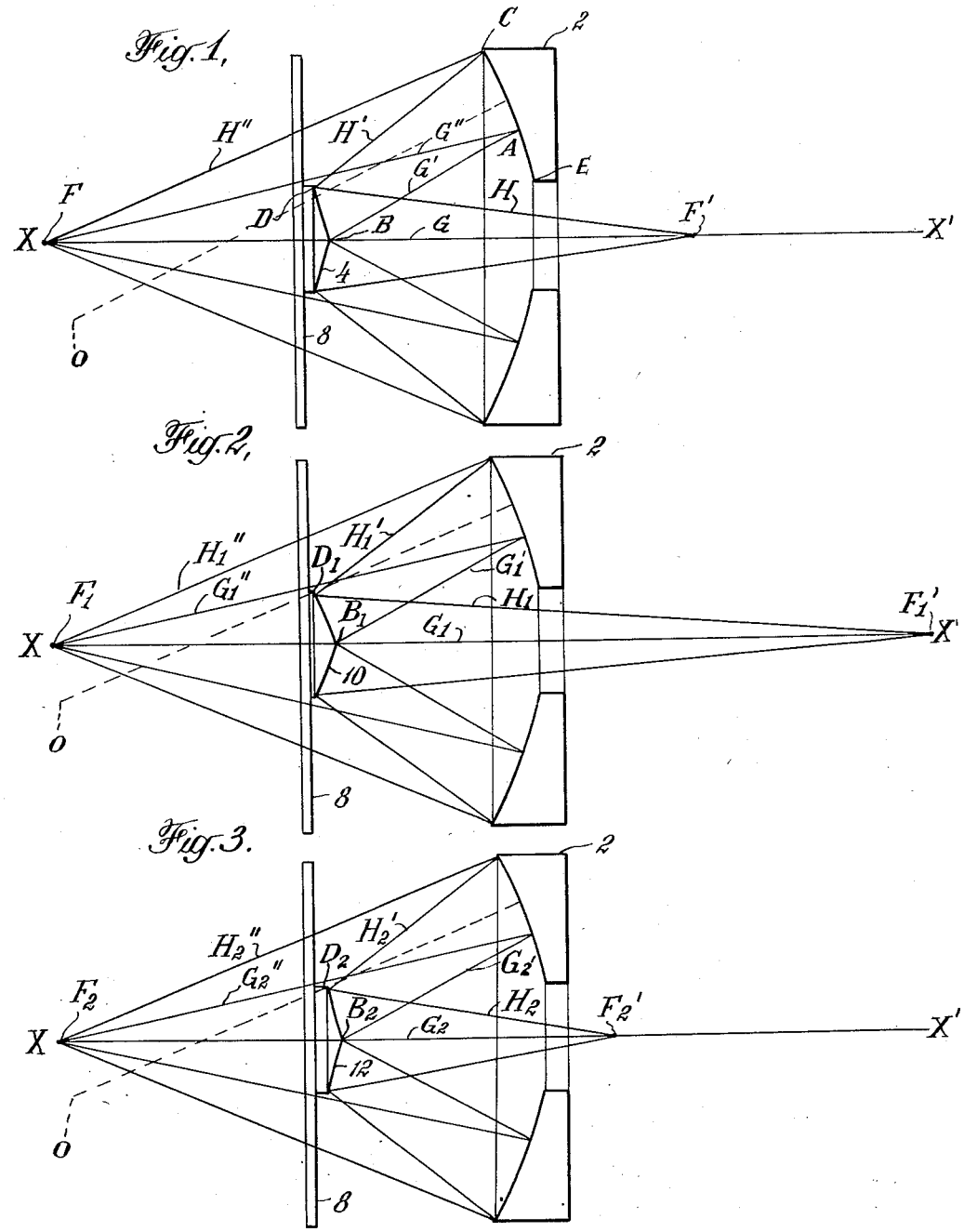

2,787,701

ILLUMINATOR

Seymour Rosin, Bronx, N. Y., assignor to Farrand Optical Co., Inc., New York, N. Y., a corporation of New York Application September 17, 1952, Serial No. 310,003

6 Claims. (Cl. 240—41.1)

This invention relates to illuminators for optical instruments and more particularly to achromatic illuminators employing reflecting surfaces rather than refracting elements. Such illuminators are employed to converge the light from a source at one location to a second location. The illuminator may be positioned to cause the light converged at the second location to act as a source of light for the illumination of the entrance slit of a spectrometric instrument, for example.

The invention provides an achromatic illuminator which generates a solid conical beam without the hole found in double mirror systems customarily employed heretofore, which employs rotationally symmetric reflecting surfaces which are easy to produce, and which is a straight-through system without bends in the over-all light path, so that with the instrument of the invention an instrument to be illuminated can be pointed directly at the ultimate source which is to be examined.

The illuminator of the invention generates a solid conical beam by the successive reflections of light diverging from a source at a zone of a first ogival surface and at a second ogival surface coaxial of the first, the source being located on or adjacent the common axis of the two reflecting surfaces.

As the term "ogival" is used herein, an ogival surface of revolution is a surface generated by the rotation of an arc of a circle about an axis not passing through its center of curvature. The circle to which the arc belongs may be of infinite radius, in which case the surface generated will be a portion of a cone.

By the use of two ogival surfaces it is possible to achieve what amounts in any meridian plane of the system to the imaging of the source successively in two spherical mirror surfaces (including surfaces of infinite radius of curvature), with the imaging bundle which converges on the final image point having one edge ray coincident with the axis of symmetry of the system, so that the cone of light converging to the final image point is solid.

The invention will now be described in terms of three exemplary embodiments illustrated in the accompanying drawings in which:

Fig. 1 is an axial section through an illuminator according to the invention in which the secondary ogival surface is conical;

Fig. 2 is an axial section through an illuminator according to the invention in which the secondary ogival surface conforms to a surface of revolution generated by the rotation of an arc of a circle of finite radius about an axis passing through the end of the arc with the axis of revolution passing between the remainder of the arc and its center of curvature; and Fig. 3 is an axial section through an illuminator according to the invention in which the secondary ogival surface conforms to a surface of revolution generated by the rotation of an arc of a circle about an axis passing through an end of the arc with the axis of revolution on the side of the remainder of the arc opposite its center of curvature.

The illuminator of Fig. 1 comprises a concave annular ogival mirror 2 and a conical ogival mirror 4. The mirror 2 is concave in the sense that on the reflecting side of its mirror surface the meridian sections of that surface are concave, and in the sense that the reflecting side of its surface is directed toward the axis. That is to say the mirror 2 is generated by rotation of an arc of a circle of finite radius about an axis passing between the arc and its center of curvature and is reflecting on the side of the surface so generated belonging to the concave side of the generating arc. In particular, the optical surface of the mirror 2 is generated by the rotation about axis X—X' of the circular arc C—E having a center of curvature at O on the side of X—X' opposite C—E. The mirror 4 is conical and is convex in the sense that its reflecting surface faces away from the axis about which it is generated. It is thus an ogival mirror generated by rotation about axis X—X' of an arc B—D of a circle of infinite radius whose center is off the axis X—X'.

The two mirrors are supported coaxially in fixed relative position by suitable means such as a lens tube not shown. The mirror 4 may be mounted within such a tube by means of a spider or transparent window as indicated at 8. The illuminator of Fig. 1 images at F' a point F which is on the common axis X—X' of its mirrors and which is located a fixed distance behind the mirror 4, F' being also on the axis X—X' and being located at a fixed distance to the right of the mirror 2.

The illuminator of Fig. 2 is similar to that of Fig. 1 except that the secondary mirror 10 is an ogival mirror generated by rotation of an arc $B_1$ $D_1$ of a circle of finite radius about an axis (X—X') passing through the end $B_1$ of that arc and between the remainder of that arc and its center of curvature, which in Fig. 2 is below the axis X—X' but off the figure to the left. The mirror 10 of Fig. 2 is convex both in the sense that the reflecting side of the surface to which it conforms belongs to the convex side of its generating arc and in the sense that this reflecting side is throughout the entire extent of the mirror directed away from the axis about which it is generated.

This change in the form of the secondary mirror shifts the point $F_1'$ at which the source point $F_1$ is imaged out to the right, increasing the separation between the source and image points, and decreasing the angular aperture of the solid illuminating cone provided at $F_1'$. For purposes of illustration the primary mirror 2 of Fig. 2 is shown as being identical to that of Fig. 1. Moreover in the two figures the primary and secondary mirrors are supported the same distance apart, and the source point $F_1$ in Fig. 2 is the same distance behind the mirror 10 as the point F is behind the mirror 4 of Fig. 1.

The illuminator of Fig. 3 is likewise similar to that of Fig. 1 except that in place of the conical ogival mirror 4 of Fig. 1 there is employed an ogival mirror 12 generated by the rotation of an arc $B_2$ $D_2$ of a circle of finite radius about an axis (X—X') passing through the end of the arc with the remainder of the arc between that axis and its center of curvature, which in Fig. 3 is above the axis X—X' to the right of the mirror 2 of that figure. The mirror 12 of Fig. 3 is concave in the sense that on its reflecting side the trace of its surface in meridian planes is concave. It is however convex in the sense that its reflecting surface is directed away from the axis.

The result of this change in the form of the secondary mirror is to decrease the separation between the source point $F_2$ and the image point $F_2'$ and to increase the angular aperture of the solid illuminating cone provided at $F_2'$.

Referring again to Fig. 1, the illuminator there shown is adapted to gather light from a point F, on the common axis X—X' of the two mirrors, located a fixed distance behind the mirror 4, and to converge it in a solid conical bundle to a focus at F', also on the axis X—X' and at a fixed distance to the right of mirror 2. F' thus constitutes the image of F as successively formed in the mirrors 2 and 4. Moreover the mirrors are so dimensioned and positioned with respect to each other and the source point F that the meridian ray G'' from F which is reflected at A on the primary mirror 2 as ray G' to intersect the axis X—X' at the apex B of the mirror 4 is, as ray G', inclined to the normal to the mirror 4 at its apex at the same angle as the angle between that normal and the axis X—X'. Ray G' is therefore reflected by the mirror 4 as ray G collinearly of the axis X—X', and ray G passes through the focus F'. The marginal meridian ray H'' from F is reflected by the mirror 2 at C as a ray H' to strike the mirror 4 marginally at D, and ray H' is reflected by the mirror 4 as a ray H to intersect the axis X—X' at F'.

Similar propositions apply in the illuminators of Figs. 2 and 3 with respect to the central and marginal rays of the cones converged thereby at their respective image points $F_1'$ and $F_2'$. The rays H'', H' are respectively identical to the rays $H_1''$, $H_1'$ and to the rays $H_2''$, $H_2'$ except for minor variations in the length of rays H', $H_1'$ and $H_2'$, and the rays G'', G' and G are respectively identical to rays $G_1''$, $G_1'$, $G_1$ and to rays $G_2''$, $G_2'$ and $G_2$. In the embodiments of the drawings therefore F', $F_1'$ and $F_2'$ are respectively the images of F, $F_1$ and $F_2$ as successively formed in the primary and secondary mirrors. The secondary mirrors 4, 10 and 12 are conical, convex or concave according as the distance between the image of the source F, $F_1$ or $F_2$ in the primary mirror 2 and the arc on which the secondary mirror is generated (produced as necessary) as measured along the line joining that image and the final image point F', $F_1'$ or $F_2'$, is equal to, greater than, or less than the distance between the arc so produced and the final image point.

Determination of the dimensions and positioning of the primary and secondary mirrors may be advantageously begun from the separation of the points F and F' (considered now without regard to the subscripts distinguishing the three embodiments of the drawings) and the angular aperture of the beam converging at F' as items of given data, since these are the characteristics of the illuminator which are of most practical interest. The axial positions of the primary and secondary mirrors between the points F and F' may also, within limits, be arbitrarily selected. It is usually desirable that the primary mirror as well as the secondary mirror lie between the points F and F', so that the primary mirror will not interfere mechanically with other elements of apparatus to be positioned at the point F'. If the image point F' is to lie on the side of the primary mirror opposite the secondary mirror, the primary mirror must be annular in shape.

With the separation of the points F and F', the angular aperture to be provided at F', and the axial positions of the primary and secondary mirrors selected, the figures of the primary and secondary mirrors may be determined by tracing back from the image point F' the central and marginal rays of the cone of light which are to be provided there. The central ray G must be reflected at the apex B of the secondary mirror as a ray G' to a position A on the primary mirror at which it will be reflected as a ray G'' back to the source point F, and the intersection A of the ray G'' with the primary must be at such a height above the axis that the ray G'' will clear the secondary mirror. The tangents in meridian planes to the secondary mirror adjacent its apex B and to the primary mirror at A, which may be at or close to its radially inner limit, are thus determined. Additionally, the marginal ray H must be reflected by the secondary mirror at D, at or close to the edge thereof, as a ray H' to the primary mirror and must in turn be reflected by the primary mirror at C, as a ray H'', in such a direction as to pass through the source ray F. The tangents to the secondary and primary mirrors at the intersections therewith of the broken ray H are therefore also determined. The figures of the primary and secondary mirrors are both uniquely determined by the four tangents at points A, C, B, and D, since at most a single circle can be passed through two points tangent to lines of specified slope passing through those points.

Illuminators according to the invention, and in any one of the embodiments shown in the drawings, may of course be constructed to any desired scale and with various combinations of radii of curvature and separation for the two mirrors. The primary mirrors have been taken as identical in the three embodiments shown simply for the purpose of illustrating the effect of variations in the shape of the secondary mirror.

It is to be noted that both primary and secondary mirrors must be ogival. If the secondary mirror were generated by the rotation of an arc of a circle about an axis passing through its center of curvature, the tangent to the apex of the secondary would be perpendicular to the system axis, and the secondary would therefore be incapable of reflecting the central ray G to an extra-axial position as is necessary if light from the axial point F is to be brought to that apex by the primary mirror. The primary mirror must also be ogival since if it were not, the image of the source point F in the primary mirror would itself lie on the system axis.

I claim:

1. An illuminator comprising a concave ogival primary mirror and a secondary ogival mirror positioned coaxially of said primary mirror with its reflecting surface facing that of said primary mirror, said illuminator being adapted to converge light diverging from a first point on the axis of said mirrors on the side of said secondary mirror remote from said primary mirror to a second point on said axis on the side of said secondary mirror remote from said first point, said mirrors having reflecting surfaces conforming to surfaces of revolution generated by arcs of circles of such diameter and having their centers so located off said axis that said second point is the image of said first point as formed successively in said primary and secondary mirrors, and that the ray from said first point which is reflected by said primary mirror to intersect said axis at the apex of said secondary mirror is reflected by said secondary mirror collinearly of said axis.

2. An illuminator comprising an annular concave ogival primary mirror and a secondary ogival mirror positioned coaxially of said primary mirror with its reflecting surface facing that of said primary mirror, said illuminator being adapted to converge light diverging from a first point on the axis of said mirrors on the side of said secondary mirror remote from said primary mirror to a second point on said axis on the side of said secondary mirror remote from said first point, said mirrors having reflecting surfaces conforming to surfaces of revolution generated by arcs of circles of such diameter and having their centers so located off said axis that the meridian ray from said first point which is reflected by said primary mirror to the edge of said secondary mirror is reflected by said secondary mirror to intersect said axis at said second point, and that the meridian ray from said first point which is reflected by said primary mirror to the apex of said secondary mirror is reflected by said secondary mirror collinearly of said axis.

3. An illuminator according to claim 2 in which said secondary mirror is conical in shape.

4. An illuminator according to claim 2 in which said secondary mirror has a reflecting surface conforming to a surface of revolution generated by rotation of an arc of a circle of infinite radius about said axis.

5. An illuminator according to claim 2 in which said secondary mirror has a reflecting surface conforming to a surface of revolution generated by the rotation of an arc of a circle of finite radius about said axis, said axis passing through an end of said arc, the center of curvature of said arc lying on the side of said axis opposite said arc.

6. An illuminator according to claim 2 in which said secondary mirror has a reflecting surface conforming to a surface of revolution generated by the rotation of an arc of a circle of finite radius about said axis, said axis passing through an end of said arc, the center of curvature of said arc lying on the same side of said axis as said arc.

References Cited in the file of this patent

UNITED STATES PATENTS 2,198,014   Ott _____ Apr. 23, 1940

FOREIGN PATENTS 421,639   Germany _____ Nov. 14, 1925
708,577   France _____ May 4, 1931